United States Patent
Minakata

(10) Patent No.: US 12,527,506 B2
(45) Date of Patent: Jan. 20, 2026

(54) CONDUCTIVE COMPOSITION, BIOMEDICAL ELECTRODE, AND BIOMEDICAL SENSOR

(71) Applicant: Nitto Denko Corporation, Ibaraki (JP)

(72) Inventor: Masayuki Minakata, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 666 days.

(21) Appl. No.: 17/914,356

(22) PCT Filed: Mar. 26, 2021

(86) PCT No.: PCT/JP2021/013016
§ 371 (c)(1),
(2) Date: Sep. 26, 2022

(87) PCT Pub. No.: WO2021/200704
PCT Pub. Date: Oct. 7, 2021

(65) Prior Publication Data
US 2023/0103591 A1    Apr. 6, 2023

(30) Foreign Application Priority Data

Mar. 30, 2020 (JP) ................................. 2020-059652
Nov. 19, 2020 (JP) ................................. 2020-192637

(51) Int. Cl.
*A61B 5/268* (2021.01)
*G01N 21/65* (2006.01)

(52) U.S. Cl.
CPC ........... *A61B 5/268* (2021.01); *G01N 21/658* (2013.01)

(58) Field of Classification Search
CPC .............................. A61B 5/268; G01N 21/658
See application file for complete search history.

(56) References Cited

U.S. PATENT DOCUMENTS

| | | |
|---|---|---|
| 2013/0284244 A1 | 10/2013 | Kato et al. |
| 2013/0306943 A1 | 11/2013 | Kato et al. |
| 2019/0359833 A1 | 11/2019 | Yamazaki et al. |
| 2020/0286641 A1 | 9/2020 | Toyoda et al. |

FOREIGN PATENT DOCUMENTS

| | | |
|---|---|---|
| CN | 103189463 A | 7/2013 |
| CN | 103229251 A | 7/2013 |
| CN | 103289617 A | 9/2013 |
| CN | 110249006 A | 9/2019 |
| EP | 3 683 275 A1 | 7/2020 |

(Continued)

OTHER PUBLICATIONS

Office Action issued on Feb. 8, 2023, in connection with Chinese Patent Application No. 202180022613.3, with English translation, 12 pages.

(Continued)

*Primary Examiner* — Linda C Dvorak
*Assistant Examiner* — Abigail Bock
(74) *Attorney, Agent, or Firm* — Hauptman Ham, LLP

(57) ABSTRACT

A conductive composition includes a binding resin and a conductive polymer, wherein the conductive polymer has a quinoid structure and a benzoid structure, and wherein a ratio of a half-width value of a peak intensity corresponding to the benzoid structure to a half width of a peak intensity corresponding to the quinoid structure in Raman spectra obtained by Raman spectroscopy is 0.5 to 12.

7 Claims, 2 Drawing Sheets

(56) References Cited

FOREIGN PATENT DOCUMENTS

| JP | 2009-283410 A | 12/2009 |
| JP | 2016-363 A | 1/2016 |
| JP | 2016-166436 A | 9/2016 |
| JP | 2019-48945 A | 3/2019 |
| WO | 2012/067490 A1 | 5/2012 |

OTHER PUBLICATIONS

The Extended European Search Report issued on Aug. 8, 2023 for corresponding European Patent Application No. 21779876.8 (10 pages).
International Search Report issued on Jun. 8, 2021, for corresponding International Patent Application No. PCT/JP2021/013016, along with an English translation (5 pages).
Written Opinion issued on Jun. 8, 2021, for corresponding International Patent Application No. PCT/JP2021/013016, (3 pages).
Office Action issued on Sep. 7, 2021 for corresponding Japanese Patent Application No. 2021-535942, along with machine translation (7 pages).
Decision to Refusal issued on Dec. 21, 2021 for corresponding Japanese Patent Application No. 2021-535942, along with machine translation (7 pages).
The explanation of circumstances concerning accelerated examination filed on Jun. 24, 2021 for corresponding Japanese Patent Application No. 2021-535942, along with machine translation (5 pages).
Office Action issued on Feb. 8, 2023, in connection with Chinese Patent Application No. 202180022613.3, with English machine translation, 12 pages.

CONDUCTIVE COMPOSITION, BIOMEDICAL ELECTRODE, AND BIOMEDICAL SENSOR

CROSS-REFERENCE TO RELATED APPLICATION

This application is a National Stage of International Application No. PCT/JP2021/013016, filed on Mar. 26, 2021, which designates the United States and was published in Japan, and which is based upon and claims priority to Japanese Patent Application No. 2020-059652 filed on Mar. 30, 2020 and Japanese Patent Application No. 2020-192637 filed on Nov. 19, 2020, in the Japan Patent Office. All of the aforementioned applications are hereby incorporated by reference in their entireties.

TECHNICAL FIELD

The present invention relates to a conductive composition, a biomedical electrode, and a biomedical sensor.

BACKGROUND ART

Biomedical sensors for measuring biometric information such as an electrocardiogram, pulse wave, electroencephalogram, myoelectric wave, and the like are used at medical institutions such as hospitals or clinics, nursing care facilities, or homes. The biomedical sensors include biomedical electrodes that contact a living body to obtain biometric information of the living body. In measuring biometric information, a biomedical sensor is applied to the skin of the living body and the biomedical electrode contacts the skin of the living body. The biometric information is measured by acquiring an electrical signal related to the biometric information with the biomedical electrode.

For example, as a biomedical electrode for such a biomedical sensor, a body surface-mounted electrode is disclosed, which is equipped with an electrode body formed using a conductive polymer and a polymer gel covering at least a part of the electrode body, and is laminated in the order of the electrode body and the polymer gel from the surface side of the skin (see, for example, Patent Document 1). In the electrode to mount on a body surface, the electrode body is in direct contact with the surface of the skin to detect biological signals.

PRIOR ART DOCUMENTS

Patent Documents

Patent Document 1: Japanese Patent Laid-Open No. 2016-363

SUMMARY OF INVENTION

Problem to be Solved by the Invention

However, sufficient conductivity may not be obtained in the electrodes including conductive polymers as disclosed in the electrode to mount on a body surface of Patent Document 1. It is also important to reduce skin roughness at the contact area of the electrode because the electrode makes direct contact with the skin of the living body.

One aspect of the present invention is to provide a conductive composition capable of improving electrical conductivity and suppressing skin roughness when used as an electrode.

Means for Solving Problem

An aspect of a conductive composition of the present invention includes a binding resin and a conductive polymer, wherein the conductive polymer has a quinoid structure and a benzoid structure, and wherein a ratio of a half width of a peak intensity corresponding to the benzoid structure with respect to a half width of a peak intensity corresponding to the quinoid structure in Raman spectra obtained by Raman spectroscopy is 0.5 to 12.

Effects of the Invention

One aspect of the present invention is to provide a conductive composition capable of improving electrical conductivity and suppressing skin roughness when used as an electrode.

DETAILED DESCRIPTION OF THE INVENTION

Figure 1:
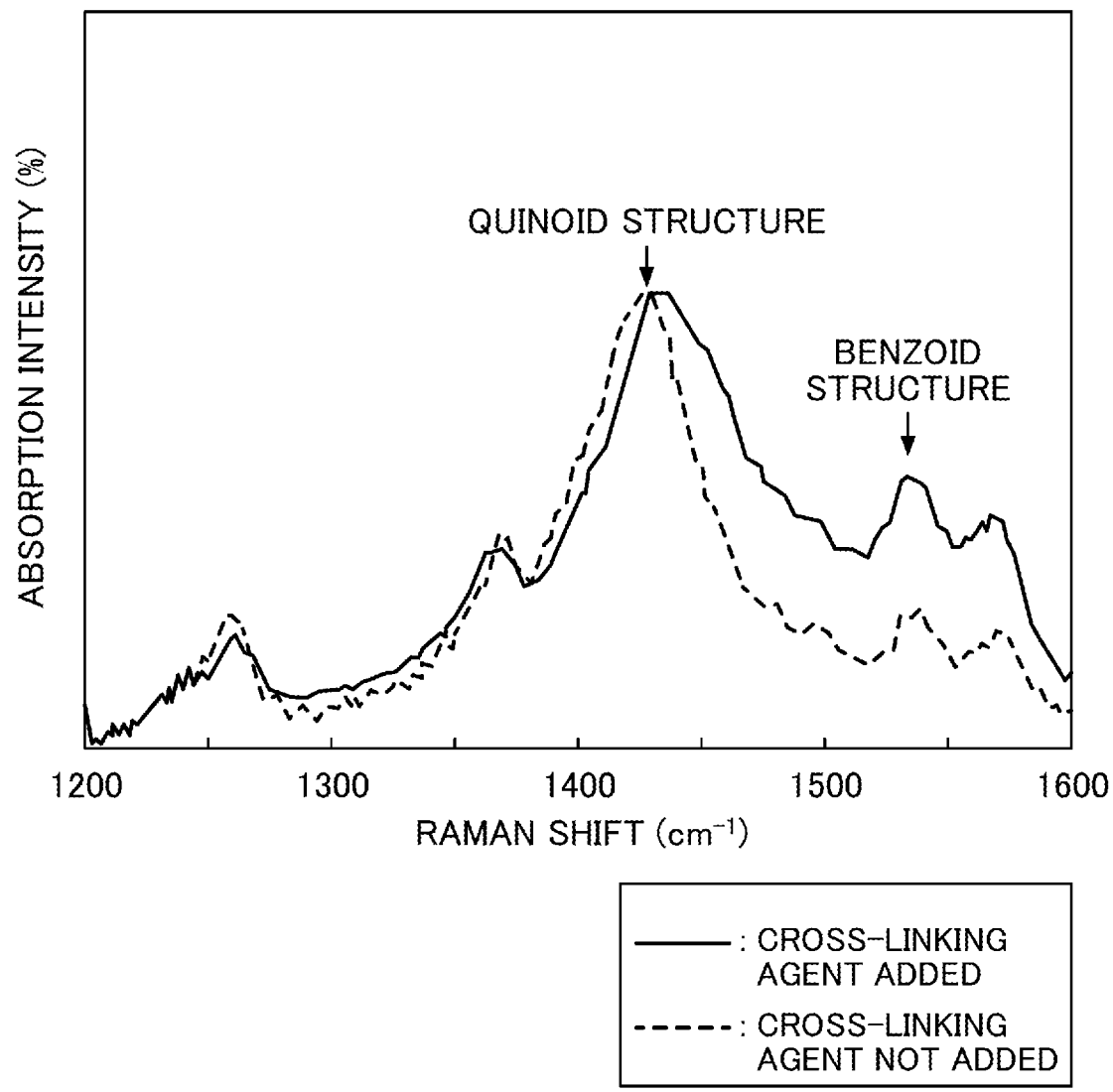
FIG. 1 is a diagram illustrating the relationship between a Raman shift and intensity.

Hereinafter, embodiments of the present invention will be described in detail. Unless otherwise noted, in this specification, "to" indicates a numerical range including the numerical values before and after the numerical range as the lower and upper limits.

Conductive Composition

A conductive composition of the present invention will be described. The conductive composition of the present embodiment includes a conductive polymer and a binding resin, wherein the conductive polymer is dispersed in the binding resin.

For example, a polythiophene-based conductive polymer, a polyaniline-based conductive polymer, a polyacetylene-based conductive polymer, a polypyrrole-based conductive polymer, a polyphenylene-based conductive polymer and derivatives thereof, and a composite thereof may be used as the conductive polymer. These may be used alone or in combination with two or more kinds.

Examples of polythiophene-based conductive polymers include polythiophene, poly(3-methylthiophene), poly(3-ethylthiophene), poly(3-propylthiophene), poly(3-butylthiophene), poly(3-hexylthiophene), poly(3-heptylthiophene), poly(3-octyltiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-methoxythiophene), poly(3-ethoxythiophene), poly(3-butoxythiophene), poly(3-hexyloxythiophene), poly(3-octyloxythiophene), poly(3-decyloxythiophene), poly(3-dodecyloxythiophene), poly(3- octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene) (also referred to as PEDOT), poly(3,4-propylene dioxythiophene), poly(3,4-butenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene), and poly(3-methyl-4-carboxybutylthiophene), and the like.

Examples of polyanionic conductive polymers include polyaniline; polymers having sulfonic acid groups such as polystyrene sulfonic acid (also referred to as PSS), polyvinyl sulfonic acid, polyallyl sulfonic acid, polyacryl sulfonic acid, poly(2-acrylamide-2-methyl propane sulfonic acid), polyisoprene sulfonic acid, polysulfoethyl methacrylate, poly(4-sulfobutyl methacrylate), polymethacryloxybenzene sulfonic acid, and the like; polymers having polyacrylic acid groups such as polyvinyl carboxylic acid, polystyrene carboxylic acid, polyallyl carboxylic acid, polyacrylic carboxylic acid, polymethacrylic carboxylic acid, polymethacrylic acid, poly(2-acrylamide-2-methylpropane carboxylic acid), polyisoprene carboxylic acid, and the like. These may be used as a homopolymer obtained by polymerizing one kind alone, or may be used as a copolymer of two or more kinds. Among these polyanions, a polymer having a sulfonic acid group is preferably used, and polystyrene sulfonic acid is more preferably used, in terms of increasing conductivity.

Examples of the polyacetylene-based conductive polymers include polyphenylacetylene monoester having an ester at the para-position of phenylacetylene, and polyacetylene having a polar group such as polyphenylacetylene monoamide having an amide at the para-position of phenylacetylene, and the like.

Examples of polypyrrole-based conductive polymers include polypyrrole, poly(N-methylpyrrol), poly(3-methylpyrrol), poly(3-ethylpyrrole), poly(3-n-propylpyrrol), poly(3-butylpyrrol), poly(3-octylpyrrole), poly(3-decylpyrrole), poly(3-dodecylpyrrole), poly(3,4-dimethylpyrrol), poly(3,4-dibutylpyrrol), poly(3-carboxypyrrol), poly(3-methyl-4-carboxyethylpyrrol), poly(3-methyl-4-carboxybutylpyrrol), poly(3-hydroxypyrol), poly(3-methoxypyrrol), poly(3-ethoxypyrrol), poly(3-butoxypyrrol), poly(3-butoxypyrrol), poly(3-hexyloxypyrrole), poly(3-methyl-4-hexyloxypyrrole), and the like.

Examples of polyphenylene-based conductive polymers include polyphenylene vinylene and the like.

Examples of these composites include polyaniline doped with polythiophene as a dopant. As a composite of polythiophene and polyaniline, a PEDOT/PSS doped with PSS in PEDOT or the like can be used.

As a conductive polymer, among the above, a composite of polythiophene doped with polyaniline as a dopant is preferably used. Among composites of polythiophene and polyaniline, PEDOT/PSS doped with PSS in PEDOT is more preferably used because of its lower contact impedance with the living body and its high electrical conductivity.

The content of the conductive polymer is preferably 0.20 to 20 parts by mass, more preferably 2.5 to 15 parts by mass, and even more preferably 3.0 to 12 parts by mass with respect to 100 parts by mass of the conductive composition. If the content is within the above-described preferred range for the conductive composition, the conductive composition can have excellent conductivity, toughness, and flexibility.

The conductive polymer may be used as an aqueous solution dissolved in a solvent. In this case, an organic solvent and a water-based solvent may be used as the solvent. Examples of the organic solvents include ketones such as acetone, methyl ethyl ketone (MEK), and the like; esters such as ethyl acetate and the like; ethers such as propylene glycol monomethyl ether and the like; and amides such as N,N-dimethylformamide and the like. Examples of the aqueous solvents include water; alcohols such as methanol, ethanol, propanol, isopropanol, and the like. Among these, the aqueous solvent is preferably used.

The conductive polymer has molecular structures including quinoid and benzoid structures. In the conductive polymer, when the polymer sites that express electrical conductivity constitute an efficient arrangement of each other, the conductive polymer is quinoidized and has a quinoid structure. For example, when the conductive polymer is PEDOT, in the state where PEDOT has an efficient arrangement of polymer sites that express electrical conductivity, PEDOT has a quinoid structure as illustrated below. When a cross-linking agent is added to PEDOT and replaces the cations in the cross-linking agent, the PEDOT is benzoidalized from the quinoid structure and becomes a benzoid structure.

[Chem. 1]

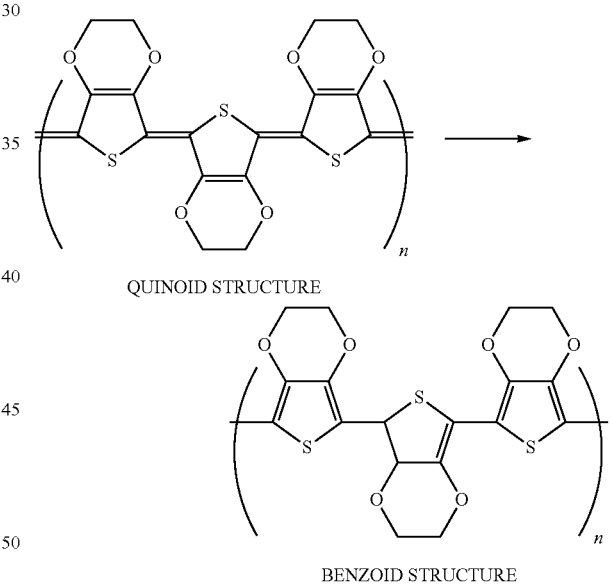

QUINOID STRUCTURE

BENZOID STRUCTURE

The quinoid or benzoid structure of PEDOT can be confirmed by Raman shift of the Raman spectra obtained by Raman spectroscopy. Specifically, by measuring the Raman scattering light using the Raman spectroscopy apparatus, as illustrated in FIG. 1, the stretching vibration of the five-membered ring is shifted, and the pulse width (half width of peak) of the Raman excitation light is broadened. Therefore, it can be confirmed that the benzoid structure is changed from the quinoid structure.

A ratio of a half width of a peak intensity corresponding to the benzoid structure with respect to a half width of a peak intensity corresponding to the quinoid structure in Raman spectra obtained by Raman spectroscopy (hereinafter, simply referred to as "a half width of a peak in benzoid structure/a half width of a peak in quinoid structure) is 0.5 to 12, preferably 0.6 to 10, and more preferably 0.7 to 10.

When examining the conductive composition including the conductive polymer and the binding resin, the inventor of the present invention has noted that the ratio of the quinoid structure constituting the conductive polymer to the benzoid structure can be changed by adjusting the content of the cross-linking agent and the like. As a ratio of the quinoid structure to the benzoid structure, the inventor of the present invention has found that when the ratio of the half width of the peak intensity corresponding to the benzoid structure with respect to the half width of the peak intensity corresponding to the quinoid structure in Raman spectra obtained by Raman spectroscopy is 0.5 to 12, the resistance of a cured material formed from the conductive composition is reduced and the decrease in pH of the cured material is suppressed.

The more the conductive polymer contains the quinoid structure, the more likely the resistance of the cured material containing the conductive polymer decreases and the conductivity increases. The ratio of the quinoid structure constituting the conductive polymer to the benzoid structure can be prepared, for example, by adding a cross-linking agent, as described above. However, when the amount of the cross-linking agent is increased to increase the ratio of the conductive polymer to the quinoid structure, the pH of the cured material containing the conductive polymer tends to be too low. On the other hand, if the amount of cross-linking agent is reduced or not added to the conductive polymer in order to increase the ratio of the benzoid structure, it is possible to suppress the decrease in the pH of the cured material including the conductive polymer. However, the higher the percentage of benzoid structure in the conductive polymer, the higher the resistance of the cured material containing the conductive polymer tends to become. As a result, the conductivity tends to be difficult to increase. The ratio of the quinoid structure to the benzoid structure constituting the conductive polymer can be prepared, for example, by adding the cross-linking agent, as described above. For example, when sodium glyoxylate or the like is added as the cross-linking agent when the conductive polymer is PEDOT/PSS or PEDOT, the ratio of the quinoid structure constituting the conductive polymer to the benzoid structure is increased by replacing the sodium glyoxylate ions with the hydrogen ions of PEDOT/PSS or replacing PEDOT. Thus, the conductive polymer tends to contain relatively more benzoid structures than quinoid structures.

The ratio of the quinoid and benzoid structures constituting the conductive polymer is related to the half width of the peak intensity corresponding to the quinoid structure and the half width of the peak intensity corresponding to the benzoid structure in the Raman spectra obtained by Raman spectroscopy, respectively, and can be determined from the half width of these peak intensities.

When the ratio of the half width of the peak intensity corresponding to the benzoid structure with respect to the half width of the peak intensity corresponding to the quinoid structure is below 0.5, the conductive polymer contains relatively more quinoid structures than benzoid structures. As a result, the conductivity of the cured material containing the conductive polymer can be increased, but the pH of the cured material containing the conductive polymer tends to be too low. As a result, the cured material tends to be in strong acidity. On the other hand, when the ratio of the half width of the peak intensity corresponding to the quinoid structure with respect to the half width of the peak intensity corresponding to the benzoid structure exceeds 12, the conductive polymer contains relatively more benzoid structures than quinoid structures. Thus, although favorable pH can be obtained for the living body, the conductivity of the cured material containing the conductive polymer tends to be too low. The conductive composition of the present embodiment can suppress the reduction in pH while preventing the decrease in resistance of the cured material containing the conductive polymer by adjusting the ratio of the half width of the peak intensity corresponding to the benzoid structure to the half width of the peak intensity corresponding to the quinoid structure after curing to 0.5 to 12. Therefore, the cured material of the conductive composition of the present embodiment can improve the conductivity and can suppress skin roughness by reducing the burden on the skin.

In the Raman spectra obtained by Raman spectroscopy, the position of the peak corresponding to the quinoid structure constituting the conductive polymer in which Raman shift (wave number) is in the range of 1200 $cm^{-1}$ to 1480 $cm^{-1}$ and the position of the peak corresponding to the benzoid structure in which Raman shift is in the range of 1485 $cm^{-1}$ to 1650 $cm^{-1}$, is preferable. The peak corresponding to the quinoid structure in which Raman shift is in the range of 1250 $cm^{-1}$ to 1450 $cm^{-1}$ is more preferable and even more preferably in the range of 1350 $cm^{-1}$ to 1435 $cm^{-1}$. The peak corresponding to the benzoid structure in which Raman shift is in the range of 1500 $cm^{-1}$ to 1550 $cm^{-1}$ is more preferable, and even more preferably in the range of 1510 $cm^{-1}$ to 1535 $cm^{-1}$. Depending on the percentage of the quinoid structure contained in the conductive composition and the percentage of the benzoid structure, the positions of these Raman spectral peaks are easily varied. If the positions of the respective peaks corresponding to the quinoid and benzoid structures in Raman spectra are within the above-described preferred ranges, the ratio of the half width of the peak intensity corresponding to the benzoid structure with respect to the half width of the peak intensity corresponding to the quinoid structure contained in the conductive composition will be easily adjusted within the range of 0.5 to 12.

The binding resin may be a water-soluble polymer or a water-insoluble polymer. The binding resin preferably employs water soluble polymers in terms of compatibility with other components included in the conductive composition. It should be noted that the water-soluble polymer is not completely soluble in water and may include a polymer having hydrophilicity (hydrophilic polymer).

As the water-soluble polymer, a hydroxyl-containing polymer or the like may be used. As the hydroxyl group-containing polymer, a sugar such as agarose, a polyvinyl alcohol (PVA), a modified polyvinyl alcohol, a copolymer of acrylic acid and sodium acrylate, or the like can be used. These may be used alone or in combination with two or more kinds. Among these, polyvinyl alcohol or modified polyvinyl alcohol is preferably used, and the modified polyvinyl alcohol is more preferably used.

Examples of the modified polyvinyl alcohols include acetoacetyl-containing polyvinyl alcohol, diacetone acrylamide-modified polyvinyl alcohol, and the like. As the diacetone acrylamide modified polyvinyl alcohol, for example, a diacetone acrylamide modified polyvinyl alcohol resin (DA modified PVA resin) described in Japanese Patent Application Laid-Open No. 2016-166436 may be used.

The content of binding resin is preferably 5 to 140 parts by mass relative to 100 parts by mass of the conductive composition, more preferably 10 to 100 parts by mass, and even more preferably 20 to 70 parts by mass. If the content is within the above preferred range for the conductive composition, the cured material obtained using the conductive composition can have excellent conductivity, toughness, and flexibility.

The binding resin may be used as an aqueous solution dissolved in the solvent. The solvent may be the same solvent as in the case of the conductive polymer described above.

The conductive composition further preferably includes either a cross-linking agent, or a plasticizer, or both. The cross-linking agent and the plasticizer impart toughness and flexibility to the cured material obtained using the conductive composition.

Toughness is a property that achieves both excellent strength and elongation. Toughness does not include properties that are significantly superior in one of strength and elongation but significantly lower in the other. Toughness includes properties that have an excellent balance of both strength and elongation.

Flexibility is a property that prevents damage such as fracture from occurring in the bent portion after the cured material containing the conductive composition is bent.

The cross-linking agent functions to cross-link the binding resin. The inclusion of a cross-linking agent in the binding resin can improve the toughness of the cured material obtained by using the conductive composition. The cross-linking agent should have reactivity with hydroxyl groups. If the cross-linking agent is reactive with hydroxyl groups, then when the binding resin is a hydroxyl group-containing polymer, the cross-linking agent can react with the hydroxyl groups of the hydroxyl group-containing polymer.

Examples of the cross-linking agents include zirconium compounds such as zirconium salts; titanium compounds such as titanium salts; boron compounds such as boric acid; isocyanate compounds such as block isocyanate; aldehyde compounds such as sodium glyoxylate, formaldehyde, acetaldehyde, glyoxal, glutaraldehyde; alkoxyl group-containing compounds; methylol group-containing compounds; and the like. These may be used alone or in combination with two or more kinds. Among them, when the binding resin is a porvinyl alcohol, sodium glyoxylate is preferable because the binding resin tends to react with the porvinyl alcohol to form a crosslinked structure, and the properties of the cured material obtained using the conductive composition is easily maintained.

The cross-linking agent is an optional component. Therefore, the cross-linking agent does not need to be included in the conductive composition, and the content of the cross-linking agent may be 0 parts by mass. When the cross-linking agent is included, the content of the cross-linking agent with respect to 100 parts by mass of the conductive composition is preferably 1.5 parts by mass or less, more preferably 0.01 parts by mass to 1.5 parts by mass, further preferably 0.2 parts by mass to 1.2 parts by mass, and most preferably 0.4 parts by mass to 1.0 parts by mass. If the content of the cross-linking agent is 1.5 parts by mass or less, the conductive polymer contained in the cured material obtained using the conductive composition can optimally be prepared so that the ratio of the half width of the peak intensity corresponding to the benzoid structure with respect to the half width of the peak intensity corresponding to the quinoid structure is in the range of 0.5 to 12. In addition, if the content of the cross-linking agent is within the more preferred range described above, the conductive polymer contained in the cured material of the conductive composition can be more reliably prepared so that the ratio of the half-maximum width of the peak intensity corresponding to the benzoid structure to the half-maximum width of the peak intensity corresponding to the quinoid structure is in the range of 0.5 to 12, and the cured material of the conductive composition can have excellent toughness and flexibility.

The cross-linking agent may be used as an aqueous solution dissolved in the solvent. The solvent may be the same solvent as in the case of the conductive polymer described above.

The plasticizer has the function of improving the conductivity of the cured material obtained using the conductive composition, as well as improving tensile elongation and flexibility. Examples of the plasticizers include polyol compounds such as glycerin, ethylene glycol, propylene glycol, sorbitol, and the like; aprotic compounds such as N-methylpyrrolidone (NMP), dimethylformaldehyde (DMF), N-N'-dimethylacetamide (DMAc), dimethyl sulfoxide (DMSO), and the like. These may be used alone or in combination with two or more kinds. Among these, glycerin is preferably used from the viewpoint of compatibility with other components.

The content of the plasticizer with respect to 100 parts by mass of the conductive composition is preferably 0.2 to 150 parts by mass, more preferably 1.0 to 90 parts by mass, and even more preferably 10 to 70 parts by mass. If the content is within the above-described preferred range, the cured material obtained using the conductive composition can have excellent toughness and flexibility.

The conductive composition includes either a cross-linking agent, a plasticizer, or the both so that the conductive polymer contained in the conductive composition can be prepared so that the ratio of the half width of the peak intensity corresponding to the benzoid structure to the half width of the peak intensity corresponding to the quinoid structure is in the range of 0.5 to 12, and the cured material obtained using the conductive composition can have improved toughness and flexibility.

When the conductive composition contains the cross-linking agent but does not contain the plasticizer, the conductive polymer contained in the cured material obtained using the conductive composition can be prepared so that the ratio of the half width of the peak intensity corresponding to the benzoid structure to the half width of the peak intensity corresponding to the quinoid structure is in the range of 0.5 to 12. Also, the cured material obtained using the conductive composition can have both improved toughness, for example, tensile strength and tensile elongation, and improved flexibility.

If the conductive composition contains the plasticizer but does not contain the cross-linking agent, the cured material obtained using the conductive composition as a whole can have improved tensile elongation of the resulting cured material, and hence the cured material obtained using the conductive composition can have improved toughness. It is also possible to improve the flexibility of the cured material obtained using the conductive composition.

The conductive composition preferably includes both the cross-linking agent and the plasticizer. By including both the cross-linking agent and the plasticizer in the conductive composition, the cured material obtained using the conductive composition can have even better toughness.

In addition to the above components, the conductive composition may optionally contain any of a variety of known additives, such as surfactants, softeners, stabilizers, leveling agents, antioxidants, antihydrolysis agents, swelling agents, thickeners, colorants, fillers, and the like, as needed. Examples of the surfactants include a silicone-based surfactant and the like.

The conductive composition is prepared by mixing each of the above components in the above ratio.

The conductive composition may optionally include the solvent in any proportion. This allows to prepare an aqueous solution of the conductive composition (aqueous conductive composition solution).

As the solvent, an organic solvent or an aqueous solvent may be used. Examples of the organic solvents include ketones such as acetone, methyl ethyl ketone (MEK), and the like; esters such as ethyl acetate and the like; ethers such as propylene glycol monomethyl ether and the like; and amides such as N,N-dimethylformamide and the like. Examples of aqueous solvents include water; alcohols such as methanol, ethanol, propanol, isopropanol, and the like. Among these, an aqueous solvent is preferably used.

The pH of the cured material obtained using the conductive composition of the present embodiment is preferably from 1 to 10, more preferably from 1 to 8, and even more preferably from 1 to 6. Measuring the pH of the cured material may be performed by any known method, for example, by contacting the litmus test paper with the cured material, or by contacting a solution of the conductive composition dissolved in the solvent with the litmus test paper, or the like.

An example of a method of manufacturing the cured material obtained using the conductive composition will be described.

The conductive composition including the conductive polymer and the binding resin is prepared by mixing the conductive polymer and the binding resin in the ratio described above. The conductive composition may further include either the cross-linking agent, the plasticizer, or the both at the ratio described above. When preparing the conductive composition, the conductive polymer, the binding resin, and the cross-linking agent may be used as the aqueous solution dissolved in the solvent.

The conductive composition may optionally contain the solvent including the conductive polymer, the binding resin, and the cross-linking agent, as well as the solvent in any suitable proportion, using the aqueous solution of the conductive composition (the aqueous conductive composition solution). A similar solvent to the above-described solvent may be used as the solvent.

After the conductive composition is applied to a surface of a release substrate, the conductive composition is heated to allow the cross-linking reaction of the binding resin contained in the conductive composition to proceed and cure the binding resin to provide a cured material of the conductive composition. The surface of the resulting cured material is punched out (pressed) or the like using a press or the like, as needed, to form one or more through-holes on the surface of the cured material and to form the shape of the cured material into a predetermined shape. This results in a biomedical electrode or electrode 30 which is a formed body having one or more through holes on its surface and having a predetermined shape. Alternatively, the cured material may be formed by a laser processing machine instead of the press machine. The resulting cured material may also form only one or more through-holes on its surface, or it may form only an external shape in a predetermined shape. Furthermore, if the cured material can be used as a biomedical electrode, the cured material may be used as a biomedical electrode without shaping or the like.

Each of the components of the conductive polymer, binding resin, cross-linking agent, and plasticizer contained in the biomedical electrode has an amount equivalent to the amount added when manufacturing the conductive composition. The ratio of the quinoid and benzoid structures of the conductive polymer contained in the biomedical electrode is similar to the conductive composition, and the ratio of the half width of the peak intensity corresponding to the benzoid structure to the half width of the peak intensity corresponding to the quinoid structure is in the range of 0.5 to 12.

As the release substrate, a separator, a core material, or the like may be used. The separator may be a resin film such as a polyethylene terephthalate (PET) film, a polyethylene terephthalate (PE) film, a polypropylene (PP) film, a polyamide (PA) film, a polyimide (PI) film, or a fluoropolymer film. As the core material, a resin film, such as a PET film or a PI film; a ceramic sheet; a metal film such as aluminum foil; a resin substrate reinforced with glass fibers or plastic non-woven fibers; a silicone substrate or a glass substrate may be used.

As a method of applying the conductive composition onto a release substrate, a method by roll coating, screen coating, gravure coating, spin coating, reverse coating, bar coating, blade coating, air knife coating, dipping, dispensing, or the like, a method by hanging a small amount of the conductive composition over the substrate and stretching it with a doctor blade, or the like can be used. By these coating methods, the conductive composition is uniformly coated onto the release substrate.

The conductive composition can be heated by known dryers such as drying ovens, vacuum ovens, air circulation ovens, hot air dryers, far infrared dryers, microwave vacuum dryers, high frequency dryers, and the like.

The heating conditions may be such that the cross-linking agent contained in the conductive composition can react.

The heating temperature of the conductive composition is such that the curing of the binding resin contained in the conductive composition can proceed. The heating temperature is preferably 100° C. to 200° C. If the conductive composition contains the cross-linking agent, the reaction of the cross-linking agent can be facilitated and the curing of the binding resin can be facilitated if the heating temperature is in the range of 100° C. to 200° C.

The heating time of the conductive composition is preferably from 0.5 minutes to 300 minutes, and more preferably from 5 minutes to 120 minutes. The binding resin can be fully cured if the heating time is in the range of 0.5 to 300 minutes.

Thus, the conductive composition of the present embodiment includes the conductive polymer, wherein the conductive polymer has the quinoid structure and the benzoid structure, and wherein the ratio of the half width of the peak intensity corresponding to the benzoid structure to the half width of the peak intensity corresponding to the quinoid structure is 0.5 to 12. Thus, the resistance of the cured material obtained by using the conductive composition can be reduced, and the decrease of pH of the cured material can be suppressed from being reduced. Therefore, when the cured material is formed and used as a biomedical electrode, the conductivity of the electrode can be improved and skin roughness can be suppressed.

The higher the conductivity of the cured material produced using the conductive composition, the lower the contact impedance of the cured material with a living body, and the more sensitive the electrical signal obtained from the living body can be, thereby increasing the accuracy of measurement of the biomedical electrode when the cured material is used as the biomedical electrode. If the contact impedance is lower, the measurement can be performed stably and accurately, and if the contact impedance is 500Ω or less, the measurement of the electrocardiogram can be performed stably as biometric information.

In addition, in the conductive composition of the present invention, in Raman spectra, the position of the peak corresponding to the quinoid structure in which Raman shift is in the range of 1200 $cm^{-1}$ to 1480 $cm^{-1}$ and the position of the peak corresponding to the benzoid structure in which Raman shift is in the range of 1485 $cm^{-1}$ to 1650 $cm^{-1}$, are possible. If the positions of the respective peaks corresponding to the quinoid and benzoid structures are within a predetermined range, the ratio of the half width of the peak intensity corresponding to the benzoid structure to the half width of the peak intensity corresponding to the quinoid structure contained in the conductive composition is facilitated to be adjusted to within the range of 0.5 to 12. Therefore, the resistance of the cured material obtained using the conductive composition can be easily reduced and the decrease of pH of the cured material can be easily suppressed from being reduced. Also, if the peaks of the quinoid and benzoid structures are within the range in Raman spectra, it can be facilitated to determine that the ratio of the half width of the peak intensity corresponding to the benzoid structure to the half width of the peak intensity corresponding to the quinoid structure contained in the conductive composition is within the range of 0.5 to 12.

Furthermore, the conductive composition of the present embodiment can use one or more components selected from the group consisting of a polythiophene-based conductive polymer, a polyaniline-based conductive polymer, a polyacetylene-based conductive polymer, and their derivatives, and their composite as a conductive polymer. These conductive polymers can include quinoid and benzoid structures. Therefore, the resistance and pH of the resulting cured material can be adjusted using the conductive composition. Therefore, it is possible to easily reduce the resistance of the cured material and the decrease of pH of the cured material can be easily suppressed from being reduced.

The conductive composition of the present embodiment may also contain 0.01 to 1.5 parts by mass of the cross-linking agent. Thereby, the composition can be readily prepared so that the quinoid and benzoid structures contained in the conductive polymer such that the ratio of the half width of the peak intensity corresponding to the benzoid structure to the half width of the peak intensity corresponding to the quinoid structure is within the range of 0.5 to 12. Therefore, when the cured material containing the conductive composition is formed and used as the biomedical electrode, the conductivity can be improved more stably and the suppressing of skin roughness can be enhanced.

The conductive composition of the present embodiment may also contain 0.2 to 150 parts by mass of the plasticizer. Accordingly, when the cured material of the conductive composition is used as the biomedical electrode, the conductivity can be improved and skin roughness can be suppressed.

The conductive composition of the present embodiment has the properties described above. Therefore, by including the cured material of the conductive composition as a material for electrodes for biological sensors (biomedical electrode), the conductive composition can be effectively used as a biomedical electrode. The biomedical electrode can be of any shape, such as a sheet.

The biomedical electrode formed using the conductive composition of the present embodiment has high conductivity and is capable of reducing irritation to the skin. Therefore, the biomedical electrode can be suitably used as a biomedical electrode of a patch-type biomedical sensor applied to a biomedical sensor, particularly to the skin of a living body, which requires high conductivity and safety to the skin.

EXAMPLES

Hereinafter, although Examples and Comparative Examples are indicated and described in further detail, embodiments are not limited by these Examples and Comparative Examples.

Example 1

Preparation of Electrode Sheet

Preparation of Conductive Composition 0.38 parts by mass of PEDOT/PSS pellet (Orgacon DRY, manufactured by Agufa Materials Japan, Inc.) as the conductive polymer, 10.00 parts by mass of the aqueous solution containing modified polyvinyl alcohol (denatured polyvinyl alcohol concentration of 10%, "Gorsenex Z-410", manufactured by Nippon Synthetic Chemical Co., Ltd.) as the binding resin, and 2.00 parts by mass of glycerin (manufactured by Wako Pure Chemical Co., Ltd.) as the plasticizer were added to an ultrasonic bath. The aqueous solution containing these components was then mixed in the ultrasonic bath for 30 minutes to prepare a uniform aqueous conductive composition solution.

The concentration of the modified polyvinyl alcohol in the aqueous solution containing the modified polyvinyl alcohol is 10%. Therefore, the content of the modified polyvinyl alcohol in the aqueous conductive composition solution is 1.00 parts by mass. The rest is the solvent in the aqueous conductive composition solution. Alternatively, a portion of the PEDOT/PSS pellet may be dissolved in water (solvent) to the extent that it does not cause a significant variation in the content of each component relative to the conductive composition.

The contents of the conductive polymer, binding resin, and plasticizer with respect to 100.00 parts by mass of the conductive composition were 11.24 parts by mass, 29.59 parts by mass, and 59.17 parts by mass, respectively.

Preparation of Electrode Sheet

The prepared aqueous conductive composition solution was coated onto a polyethylene terephthalate (PET) film using an applicator. Thereafter, the PET film coated with the aqueous conductive composition solution was transferred to a drying oven (SPHH-201, manufactured by ESPEC) to heat and dry the aqueous conductive composition solution at 120° C. for 10 minutes to prepare a cured material of the conductive composition. The cured material was pressed to form a sheet, and an electrode sheet (biomedical electrode) was prepared as a formed body.

Evaluation of Electrode Sheet

The resulting electrode sheet was evaluated for the ratio of the half width of the peak intensity corresponding to the benzoid structure to the half width of the peak intensity corresponding to the quinoid structure (the half width of the peak of the benzoid structure/the half width of the peak of the quinoid structure), pH, conductivity, and effect to skin.

Figure 2:
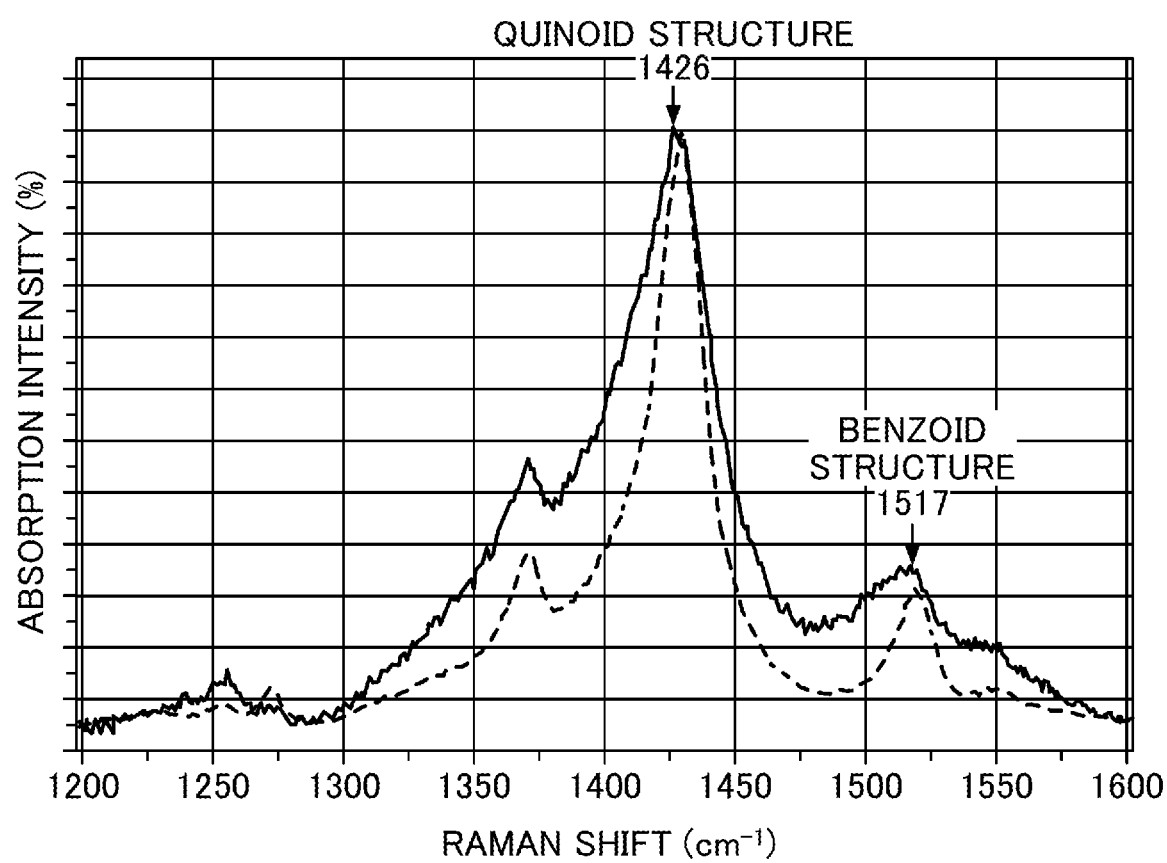
FIG. 2 is a diagram illustrating the measurement results of the Raman spectra of Examples 1 and 2.

Evaluation of Ratio of Half Width of Peak of Benzoid Structure/Half Width of Peak of Quinoid Structure The resulting electrode sheet was sectioned to prepare a measurement sample. The cross-section of the measurement sample was spectrophotometrically analyzed by Raman spectroscopy under the following conditions to confirm the peak derived from the quinoid structure and the peak derived from the benzoid structure. As a result, the half width of the peak derived from the quinoid structure was about 53.4 $cm^{-1}$, the half width of the peak derived from the benzoid structure was about 233.4 $cm^{-1}$, and the ratio of the half width of the peak intensity corresponding to the benzoid structure to the half width of the peak intensity corresponding to the quinoid structure (half width of the peak of the benzoid structure/half width of the peak of the quinoid structure) was 4.40. The measurement results of the Raman spectra are indicated in FIG. 2.

Measurement Conditions

Point Analysis Conditions
  Measuring equipment: LabRAM HR-800, manufactured by Jobin Yvon S.A.S.
  Excitation wavelength: 633 nm
  Measurement wavenumber range: 1200 $cm^{-1}$ to 1600 $cm^{-1}$
  Detector: CCD Evaluation of pH The resulting electrode sheet was subjected to litmus test paper to measure the pH of the electrode sheet.

Evaluation of Conductivity

The resistivity of the resulting electrode sheet was measured and the conductivity was evaluated based on the following criteria. When the resistance value was 50Ω or less, it was evaluated as excellent (in Table 1, referred to as "A"). When the resistance value exceeded 50Ω and was 100Ω or less, it was evaluated as good (in Table 1, referred to as "B"). When the resistance value exceeded 100Ω and was 500Ω or less, it was evaluated as fair (in Table 1, referred to as "C"). When the resistance value exceeded 500Ω, it was evaluated as bad (in Table 1, referred to as "D").

Measurement Conditions

A: Resistance value is 50Ω or less
B: Resistance value exceeds 50Ω and 100Ω or less
C: Resistance value exceeds 100Ω and 500Ω or less
D: Resistance value exceeds 500Ω

Evaluation of Effects on the Skin

The resulting electrode sheet was applied to the skin of a subject for 24 hours, and then the electrode sheet was peeled off. The roughness of the skin where the electrode sheet was applied was visually observed, and the effect on the skin was evaluated according to the following evaluation criteria. If skin roughness was not observed, it was evaluated as excellent (indicated as "A" in Table 1). If a slight redness was observed in the patch area but the redness immediately disappeared, it was evaluated as good (indicated as "B" in Table 1). If redness was observed in the patch area but the redness did not cause pain, it was evaluated as fair (indicated as "C" in Table 1). If redness and roughness were observed in the patch area, it was evaluated as bad (indicated as "D" in Table 1).

Measurement Conditions

A: No skin roughness was observed.
B: Redness immediately disappeared on the applied area.
C: Painless redness was appeared on the applied area.
D: Skin roughness was left on the applied area.

Example 2

Example 2 was performed in the same manner as in Example 1, except that 0.20 parts by mass of sodium glyoxylate ("SafeLink SPM-01", manufactured by Mitsubishi Chemical Corporation) as a cross-linking agent was added to the conductive composition.

The content of each component (conductive polymer, binding resin, cross-linking agent, and plasticizer) in the conductive composition prepared in this example was 10.61 parts by mass, 27.93 parts by mass, 5.59 parts by mass, and 55.87 parts by mass, respectively, with respect to 100.00 parts by mass of the conductive composition.

In addition, the half width of the peak derived from the quinoid structure of the conductive polymer contained in the resulting electrode sheet was about 27.8 $cm^{-1}$. The half width of the peak derived from the benzoid structure was about 25.3 $cm^{-1}$. The ratio of the half width of the peak intensity corresponding to the benzoid structure to the half width of the peak intensity corresponding to the quinoid structure was 0.91. The measurement results of the Raman spectra are indicated in FIG. 2.

Example 3

Example 3 was performed in the same manner as in Example 1, except that 1.00 parts by mass of sodium glyoxylate ("SafeLink SPM-01", manufactured by Mitsubishi Chemical Corporation) as a cross-linking agent was added to the conductive composition.

The content of each component (conductive polymer, binding resin, cross-linking agent, and plasticizer) in the conductive composition prepared in this example was 8.68 parts by mass, 22.83 parts by mass, 22.83 parts by mass, and 45.66 parts by mass, respectively, with respect to 100.00 parts by mass of the conductive composition.

Also, the ratio of the half width of the peak intensity corresponding to the benzoid structure to the half width of the peak intensity corresponding to the quinoid structure of the conductive polymer contained in the resulting electrode sheet was 0.70.

Example 4

Example 4 was performed in the similar manner as in Example 1, except that the ratio of the half width of the peak intensity corresponding to the benzoid structure the half width of the peak intensity corresponding to the quinoid structure of the conductive polymer contained in the resulting electrode sheet was changed to be 10.00, and the pH of the aqueous conductive composition solution was changed to 1.5 or less. The ratio of the half width of the peak intensity corresponding to the benzoid structure to the half width of the peak intensity corresponding to the quinoid structure was adjusted to 10.00.

Example 5

Example 5 was performed in the similar manner as in Example 1, except that the ratio of the half width of the peak intensity corresponding to the benzoid structure to the half width of the peak intensity corresponding to the quinoid structure of the conductive polymer contained in the resulting electrode sheet was changed to be 3.00, and the pH of the aqueous conductive composition solution was changed to 7.0. The ratio of the half width of the peak intensity corresponding to the benzoid structure to the half width of the peak intensity corresponding to the quinoid structure was adjusted to be the same as Example 1.

Example 6

Example 6 was performed in the similar manner as in Example 1, except that the ratio of the half width of the peak intensity corresponding to the benzoid structure to the half width of the peak intensity corresponding to the quinoid structure of the conductive polymer contained in the resulting electrode sheet was changed to be 2.00, and the pH of the aqueous conductive composition solution was changed to 9.0. The ratio of the half width of the peak intensity corresponding to the benzoid structure to the half width of the peak intensity corresponding to the quinoid structure was adjusted to be the same as Example 1.

Example 7

In Example 7, 0.20 parts by mass of sodium glyoxylate ("SafeLink SPM-01", manufactured by Mitsubishi Chemical Corporation) as a cross-linking agent was added to the conductive composition. Then, the ratio of the half width of the peak intensity corresponding to the benzoid structure to the half width of the peak intensity corresponding to the quinoid structure of the conductive polymer contained in the resulting electrode sheet was changed to 1.00, and the pH of the aqueous conductive composition solution was changed to 7.0. The other procedures were performed in the same manner as in Example 1. The ratio of the half width of the peak intensity corresponding to the benzoid structure to the half width of the peak intensity corresponding to the quinoid structure was performed in the same manner as in Example 1 above.

The content of each component (conductive polymer, binding resin, cross-linking agent, and plasticizer) in the conductive composition prepared in this example was 10.61 parts by mass, 27.93 parts by mass, 5.59 parts by mass, and 55.87 parts by mass, respectively, with respect to 100.00 parts by mass of the conductive composition.

Example 8

In Example 8, the conductive polymer was changed to polyaniline (polyaniline (Emeraldin salt), manufactured by Sigma Aldrich). Then, the ratio of the half width of the peak intensity corresponding to the benzoid structure to the half width of the peak intensity corresponding to the quinoid structure of the conductive polymer contained in the resulting electrode sheet was changed to 3.20, and the pH of the aqueous conductive composition solution was changed to 4.0. The other procedures were performed in the same manner as in Example 1. The ratio of the half width of the peak intensity corresponding to the benzoid structure to the half width of the peak intensity corresponding to the quinoid structure was performed in the same manner as in Example 1 above.

Example 9

In Example 9, the conductive polymer was changed to polyacetylene. Then, the ratio of the half width of the peak intensity corresponding to the benzoid structure to the half width of the peak intensity corresponding to the quinoid structure of the conductive polymer contained in the resulting electrode sheet was changed to 3.80, and the pH of the aqueous conductive composition solution was changed to 4.0. The other procedures were performed in the same manner as in Example 1. The ratio of the half width of the peak intensity corresponding to the benzoid structure to the half width of the peak intensity corresponding to the quinoid structure was performed in the same manner as in Example 1 above. It should be noted that polyacetylene was produced by using a Ziegler-Natta catalyst and acetylene gas as a raw material. The Ziegler-Natta catalyst was prepared by dissolving tetrabutoxytitanium and triethylaluminium in toluene.

Comparative Example 1

Comparative Example 1 was performed in the same manner as in Example 1, except that 2.00 parts by mass of sodium glyoxylate ("SafeLink SPM-01", manufactured by Mitsubishi Chemical Corporation) as a cross-linking agent was added to the conductive composition.

The content of each component (conductive polymer, binding resin, cross-linking agent, and plasticizer) in the conductive composition prepared in this example was 7.06 parts by mass, 18.59 parts by mass, 37.17 parts by mass, and 37.17 parts by mass, respectively, with respect to 100.00 parts by mass of the conductive composition.

Also, the ratio of the half width of the peak intensity corresponding to the benzoid structure to the half width of the peak intensity corresponding to the quinoid structure of the conductive polymer contained in the resulting electrode sheet was 0.40.

Comparative Example 2

In Comparative Example 2, the ratio of the half width of the peak intensity corresponding to the benzoid structure to the half width of the peak intensity corresponding to the quinoid structure of the conductive polymer contained in the resulting electrode sheet was changed to 15.00, and the pH of the aqueous conductive composition solution was changed to 1.0 or less. The other procedures were performed in the same manner as in Example 1. The ratio of the half width of the peak intensity corresponding to the benzoid structure to the half width of the peak intensity corresponding to the quinoid structure was performed in the same manner as in Example 1 above.

Comparative Example 3

In Comparative Example 3, the ratio of the half width of the peak intensity corresponding to the benzoid structure to the half width of the peak intensity corresponding to the quinoid structure of the conductive polymer contained in the resulting electrode sheet was changed to 0.40, and the pH of the aqueous conductive composition solution was changed to 12. The other procedures were performed in the same manner as in Example 1. The ratio of the half width of the peak intensity corresponding to the benzoid structure to the half width of the peak intensity corresponding to the quinoid structure was performed in the same manner as in Example 1 above.

In the obtained electrode sheet in each Example and Comparative Example, Table 1 indicates the measurement results of the ratio of the half width of the peak intensity corresponding to the benzoid structure to the half width of the peak intensity corresponding to the quinoid structure (the half width of the peak of the benzoid structure/the half width of the peak of the quinoid structure) and the measurement results of pH. The evaluation results of the conductivity of the obtained electrode sheet and the effect on the skin were indicated in Table 1. Note that the brackets for each component in Table 1 indicate the weight of each component when the total mass of the components obtained by removing the solvent from the aqueous conductive composition solution is 100.00 parts by mass.

suppressing the effect on the skin. Therefore, when the conductive composition of the present embodiment is used as the biomedical electrode, the conductivity can be improved and skin roughness can be suppressed. Thus, the biomedical sensor can be effectively used to stably measure a cardiac electrogram for a long period of time (for example, 24 hours) continuously by adhering it to the subject's skin.

Although the embodiments have been described as above, the embodiments are presented by way of example and the invention is not limited by the embodiments. The embodiments may be implemented in various other forms, and various combinations, omissions, substitutions, modifications, or the like, may be made without departing from the spirit of the invention. These embodiments and modifications thereof are included in the scope and gist of the invention and fall within the scope of the claimed invention and equivalents thereof.

The invention claimed is:

1. A conductive composition comprising:
a binding resin and a conductive polymer,

TABLE 1

| | Aqueous conductive composition solution Composition (parts by mass) | | | | | | Electrode sheet | | | |
|---|---|---|---|---|---|---|---|---|---|---|
| | Conductive polymer | Binder resin | Cross-linking agent | Plasticizer | Total | Remainder | Half width of peak of benzoid structure/Half width of peak of quinoid structure | pH | Conductivity | Effect on skin |
| Example 1 | 0.38 (11.24) | 1.00 (29.59) | 0.00 (0.00) | 2.00 (59.17) | 3.38 (100.00) | 96.62 (—) | 4.40 | 2.0 | A | B |
| Example 2 | 0.38 (10.61) | 1.00 (27.93) | 0.20 (5.59) | 2.00 (55.87) | 3.58 (100.00) | 96.42 (—) | 0.91 | 2.0 | B | B |
| Example 3 | 0.38 (8.68) | 1.00 (22.83) | 1.00 (22.83) | 2.00 (45.66) | 4.38 (100.00) | 95.62 (—) | 0.70 | 2.0 | C | B |
| Example 4 | 0.38 (11.24) | 1.00 (29.59) | 0.00 (0.00) | 2.00 (59.17) | 3.38 (100.00) | 96.62 (—) | 10.00 | 1.5 | B | C |
| Example 5 | 0.38 (11.24) | 1.00 (29.59) | 0.00 (0.00) | 2.00 (59.17) | 3.38 (100.00) | 96.62 (—) | 3.00 | 7.0 | B | A |
| Example 6 | 0.38 (11.24) | 1.00 (29.59) | 0.00 (0.00) | 2.00 (59.17) | 3.38 (100.00) | 96.62 (—) | 2.00 | 9.0 | B | C |
| Example 7 | 0.38 (10.61) | 1.00 (27.93) | 0.20 (5.59) | 2.00 (55.87) | 3.58 (100.00) | 96.62 (—) | 1.00 | 7.0 | B | A |
| Example 8 | 0.38 (11.24) | 1.00 (29.59) | 0.00 (0.00) | 2.00 (59.17) | 3.38 (100.00) | 96.62 (—) | 3.20 | 4.0 | B | B |
| Example 9 | 0.38 (11.24) | 1.00 (29.59) | 0.00 (0.00) | 2.00 (59.17) | 3.38 (100.00) | 96.62 (—) | 3.80 | 4.0 | B | B |
| Comparative Example 1 | 0.38 (7.06) | 1.00 (18.59) | 2.00 (37.17) | 2.00 (37.17) | 5.38 (100.00) | 96.62 (—) | 0.40 | 2.0 | D | B |
| Comparative Example 2 | 0.38 (11.24) | 1.00 (29.59) | 0.00 (0.00) | 2.00 (59.17) | 3.38 (100.00) | 96.62 (—) | 15.00 | 1.0 or less | B | D |
| Comparative Example 3 | 0.38 (11.24) | 1.00 (29.59) | 0.00 (0.00) | 2.00 (59.17) | 3.38 (100.00) | 96.62 (—) | 0.40 | 12.0 | D | D |

From Table 1, in Examples 1 to 9, the conductivity of the electrode sheets was 100Ω or less, and roughness on skin was not appreciably observed. On the other hand, in Comparative Examples 1 to 3, the conductivity of the electrode sheets was high or roughness on skin was observed.

Therefore, the aqueous conductive composition solution of Examples 1 to 9 differs from the aqueous conductive composition solution of Comparative Examples 1 to 3 in that the electrode sheet contains the quinoid structure and the benzoid structure as the molecular structure of the conductive polymer, and in the Raman spectra obtained by Raman spectroscopy, the ratio of the half width of the peak intensity corresponding to the benzoid structure to the half width of the peak intensity corresponding to the quinoid structure was set at 0.70 to 10.00, thereby increasing the conductivity and wherein the conductive polymer has a quinoid structure and a benzoid structure, and
wherein a ratio of a half width of a peak intensity corresponding to the benzoid structure to a half width of a peak intensity corresponding to the quinoid structure in Raman spectra obtained by Raman spectroscopy is 0.5 to 12.

2. The conductive composition according to claim 1, wherein a peak corresponding to the quinoid structure in the Raman spectra is in the range of 1200 $cm^{-1}$ to 1480 $cm^{-1}$ and a peak corresponding to the benzoid structure is in the range of 1485 $cm^{-1}$ to 1650 $cm^{-1}$.

3. The conductive composition according to claim 1, wherein the conductive polymer is one or more components selected from the group consisting of polythiophene-based conductive polymer, polyaniline-based conductive polymer, and derivatives thereof, and a composite thereof.

4. Conductive composition according to claim 1, wherein the conductive composition contains 1.5 parts by mass or less with respect to 100 parts by mass of the conductive composition of a cross-linking agent.

5. The conductive composition according to claim 1, wherein the conductive composition contains 0.2 parts by mass or more and 150 parts by mass or less with respect to 100 parts by mass of the conductive composition of a plasticizer.

6. A biomedical electrode comprising a cured material of the conductive composition of claim 1.

7. A biomedical sensor comprising the biomedical electrode of claim 6.

* * * * *